United States Patent [19]

Watanuki

[11] Patent Number: 4,719,394
[45] Date of Patent: Jan. 12, 1988

[54] HORIZONTAL OUTPUT CIRCUIT

[75] Inventor: Kiyoshi Watanuki, Yokohama, Japan

[73] Assignee: Hitachi, Ltd., Tokyo, Japan

[21] Appl. No.: 824,096

[22] Filed: Jan. 30, 1986

[30] Foreign Application Priority Data

Jan. 30, 1985 [JP] Japan .................................. 60-14204

[51] Int. Cl.$^4$ ........................ H01J 29/70; H01J 29/76
[52] U.S. Cl. .................................................. 315/408
[58] Field of Search ................................ 315/408, 399

[56] References Cited
U.S. PATENT DOCUMENTS
4,242,714 12/1980 Yoshida et al. ...................... 315/408

Primary Examiner—Theodore M. Blum
Attorney, Agent, or Firm—Antonelli, Terry & Wands

[57] ABSTRACT

In a horizontal deflection circuit having a series circuit of a horizontal deflection coil and S-shape capacitor and a parallel circuit of a switching element and a second capacitor connected in series with said series circuit, there is provided a resonation circuit having a resonating frequency with the second capacitor that is substantially equal to the horizontal deflection frequency or a little lower than that for purposes of regulation of the high voltage of the cathode ray tube.

14 Claims, 6 Drawing Figures

FIG. 1
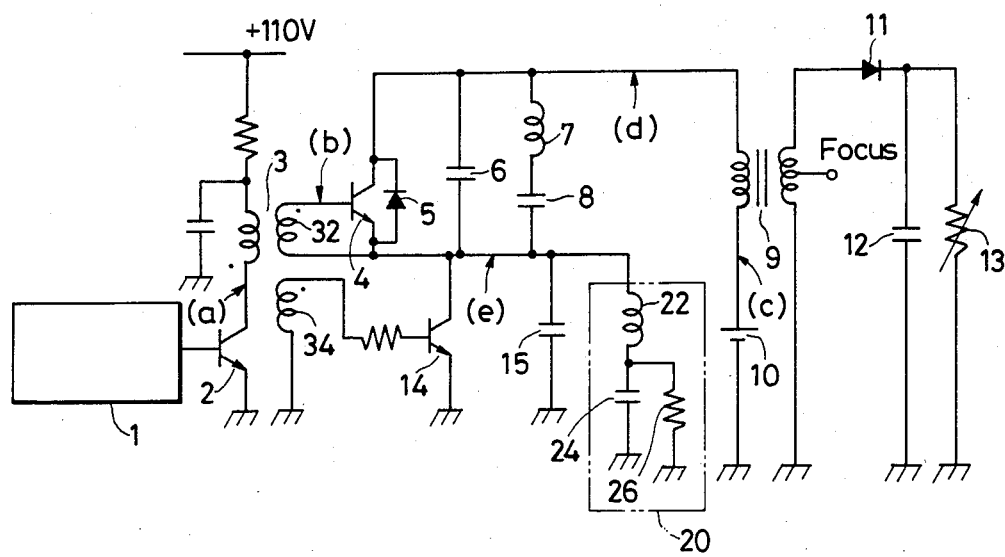
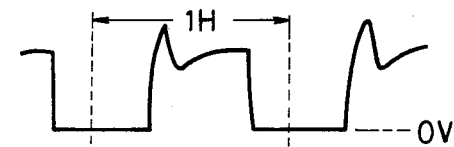
FIG. 2(a)
FIG. 2(b)
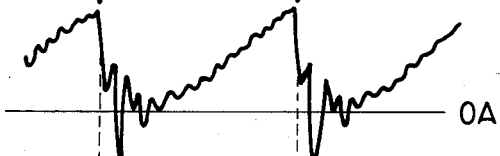
FIG. 2(c)
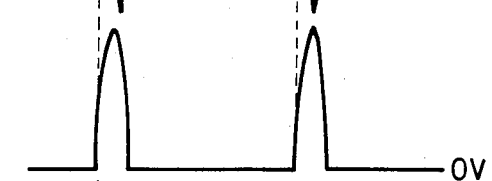
FIG. 2(d)
FIG. 2(e)

HORIZONTAL OUTPUT CIRCUIT

BACKGROUND OF THE INVENTION

This invention relates to a horizontal output circuit for a cathode ray tube, especially to a horizontal output circuit which is capable of correcting picture distortion caused by a change of load voltage at the anode of the CRT.

A horizontal output circuit including a series circuit of a horizontal deflection coil and S-shape capacitor connected in parallel with the horizontal output transistor, and in which an additional capacitor is connected in series to the S-shape capacitor and across the output of a further switching transistor, has been invented by the same inventor as the present invention and is disclosed in Japanese Laid-Open Patent No. 160378/1984. In this circuit, the further capacitor is connected between the series circuit, including the horizontal deflection coil and the S-shaped capacitor, and ground. As a result, picture distortion in which the horizontal length of the picture on the screen of the CRT is increased due to a decrease of the high voltage at the anode of the picture tube, is corrected by compensating the amplitude of the horizontal deflection current.

More particularly, in this prior circuit the voltage across the S-shape capacitor is reduced by the further capacitor interposed in series into the charge path for the S-shape capacitor during a time when the further switching transistor connected to the further capacitor is in the OFF state. Thus, a more stable picture in the face of fluctuations in the level of the high voltage is possible.

However, it has been found that in such a circuit, the regulation characteristic of the high voltage is deteriorated by the decrease in the amplitude of the horizontal flyback pulse resulting from the decrease of the amplitude of the horizontal deflection current caused by the decrease of the voltage across the S-shape capacitor. This deterioration of the regulation characteristic of the high voltage produces (1) a lack of brightness in the picture, (2) a decrease of the low DC voltage used for other circuits, such as the sound amplifier, obtained by rectifying and smoothing the low amplitude flyback pulse generated at another winding of the flyback transformer, (3) a decrease of the focus voltage generated at an intermediate terminal of the secondary winding of the flyback transformer, and so on. Thus, it has been found that although the prior circuit solves one problem, it also creates other problems at the same time.

SUMMARY OF THE INVENTION

It is an object of the invention to provide a horizontal output circuit presenting a good regulation characteristic for the high voltage.

According to the invention, there is provided a deflecting circuit comprising a horizontal deflection coil, S-shape capacitor connected in series with said horizontal deflection coil, first switching means connected in parallel with the series circuit of said horizontal deflection coil and said S-shape capacitor for carrying a horizontal deflection current therethrough during a horizontal scan period, a resonating capacitor connected in parallel with said series circuit for resonating with said series circuit to generate a flyback pulse during a horizontal retrace period, a DC voltage source, connecting means including inductive means connected between said deflecting circuit and said DC voltage source for supplying a DC component to said deflecting circuit, voltage generating means interposed into said connecting means for generating therebetween a voltage in accordance with the beam current of the CRT to reduce the voltage across said S-shape capacitor, and superimposing means connected to said series circuit for superimposing on said flyback pulse during said horizontal retrace period a pulse whose amplitude is responsive to said beam current to maintain the amplitude level of said flyback pulse.

BRIEF DESCRIPTION OF THE DRAWINGS

FIG. 1 is a schematic circuit diagram of an embodiment of the present invention.

FIGS. 2(a) through 2(e) are diagrams of voltage or current waveforms at various circuit points in the circuit of FIG. 1.

DESCRIPTION OF THE PREFERRED EMBODIMENT

In FIG. 1, reference numeral 1 denotes a horizontal oscillating stage, which applies its output to the base electrode of a horizontal drive transistor 2. A horizontal drive transformer 3 has a primary winding connected to the collector of drive transistor 2 and two secondary windings 32 and 34. The secondary winding 32 is connected across the base and emitter electrodes of a horizontal output transistor 4; and a damper diode 5, a resonating capacitor 6, and a series connection of a horizontal deflection coil 7 and an S-shape correcting capacitor 8 are each connected across the emitter and collector electrodes of the transistor 4. The primary winding of a flyback transformer 9 is connected in series with a DC voltage source 10 to one end of the horizontal deflection coil 7, and a high voltage rectifier 11 is connected to the secondary winding thereof. A capacitance 12 and a load impedance 13 of a CRT are connected in parallel to the high voltage rectifier 11. A correction transistor 14 has its base connected through resistor 16 to the other secondary winding 34 of drive transformer 3, and a capacitor 15 is connected to the collector of transistor 14.

FIG. 2 at (a), (b) and (d) shows the voltage waveform at the collector of transistor 2, the current waveform at the base of output transistor 4 and the voltage waveform at the collector of output transistor 4, respectively. In FIG. 2(e), a solid line and a dotted line show the voltage waveform at the collector of correction transistor 14 with and without dotted block 20, respectively.

The circuit shown in FIG. 1, except for the part shown in dotted block 20, is disclosed in the aforementioned Japanese laid-open Patent No. 160378/1984. In this circuit, load impedance 13 represents the equivalent impedance for the current path through which the beam current of the CRT flows, so that the more the beam current increases, the more the value of the load impedance 13 decreases. In this circuit, the storage time of transistor 14 is made to be shorter than that of transistor 4; therefore, the time at which transistor 14 is turned off precedes the time at which transistor 4 is turned off. Accordingly, since capacitor 15 is charged during the time when transistor 14 is in the OFF state by the primary current (FIG. 2(c)) flowing through the primary winding of the flyback transformer 9, and since the DC component of the primary current of transformer 9 is responsive to the load impedance 13 connected to the secondary winding of the flyback transformer 9, the voltage (FIG. 2(e)) across capacitor 15 is responsive to variations in the load impedance 13. Since the voltage across S-shape correction capacitor 8 is responsive to the voltage across capacitor 15 as well as the DC voltage source 10, which is constant, the voltage across S-shape capacitor 8 is responsive to the value of the load impedance 13. That is, the more the beam current of the CRT increases, i.e., the more the value of load impedance 13, decreases, the more the high voltage at the anode of rectifier 11 and the voltage across S-shape correction capacitor 8 decrease. Therefore, any increase of the picture size caused by a decrease of the high voltage is corrected by a decrease in the amplitude of the horizontal deflection current caused by a decrease of the voltage across the S-shape correction capacitor 8.

As can be seen from the foregoing description, by providing the S-shape capacitor 8 in series with the horizontal deflection coil 7 and the capacitor 15 in series with this circuit to ground, an undesirable increase in the size of the picture in response to decrease of the high voltage can be avoided.

However, since the decrease of the voltage across S-shape capacitor 8 causes a decrease of the amplitude of the flyback pulse applied at the primary winding of flyback transformer 14, it also causes an undesirable decrease of the high voltage produced from the secondary winding. This problem is solved by the present invention in the following way.

Dotted block 20 comprises a coil 22 which resonates with capacitor 15 at the horizontal scanning frequency or a little less than that, a capacitor 24 which operates as a DC voltage source for coil 22 in a manner similar to S-shape capacitor 8 operating as a voltage source for horizontal deflection coil 7, and resistor 26 which prevents capacitor 24 from being over-charged by the primary current. This circuit operates to concentrate the voltage generation across capacitor 15 within the horizontal flyback period. Since the voltage across capacitor 24 depends on the DC component of the primary current responsive to load impedance 13, and since the amplitude of the flyback pulse produced at the connecting point of capacitor 15 and coil 22 depends on the voltage across capacitor 24, the flyback pulse at the connecting point depends on the primary current. Since the pulse applied to the primary winding of flyback transformer 9 is the sum of the flyback pulse produced by horizontal deflection coil 7 and the flyback pulse produced by coil 22, any decrease in the amplitude of the flyback pulse from horizontal deflection coil 7 is compensated by an increase of the flyback pulse from coil 22. Therefore, the amplitude of the pulse applied to the primary winding of flyback transformer 9 is almost maintained constant even if the DC component of the primary current changes.

Although only one illustrated embodiment in accordance with the present invention is described, it is understood that the invention is not limited thereto but may include numerous changes and modifications known and/or realizable to one having ordinary skill in the art and we therefore do not wish to be limited to the details shown and described herein, but intend to cover all such modifications as are encompassed by the scope of the appended claims.

I claim:

1. A horizontal output circuit for a cathode ray tube comprising:
    a horizontal deflection coil;
    a first capacitor connected in series with said horizontal deflection coil;
    switching means, including a horizontal output transistor and a switching element connected in series, said horizontal output transistor being connected in parallel with the series circuit of said horizontal deflection coil and said first capacitor, for conducting a horizontal deflection current therethrough during a horizontal scan period;
    a resonating capacitor connected in parallel with said series circuit for resonating with said series circuit to generate a flyback pulse during a horizontal retrace period;
    a DC voltage source having first and second ends;
    means including inductive means connected between said horizontal deflection coil and said first end of said DC voltage source for supplying to said horizontal deflection coil a DC component which is dependent upon the beam current of the cathode ray tube;
    voltage generating means conected between one end of said series circuit and said second end of said DC voltage source and being responsive to said DC component for generating a voltage in accordance with said beam current to reduce the voltage across said first capacitor in response to an increase in said beam current;
    said switching element being connected between said one end of said series circuit and said other end of said DC voltage source for alternately turning on and off at the horizontal scan frequency, wherein said horizontal output transistor and said switching element have a fixed switching phase relationship, and also the time at which said switching element is turned off from its conductive state by said control means precedes the turn-off time of said horizontal output transistor; and
    superimposing means connected to said series circuit for compensating any adverse change of the flyback pulse by superimposing on said flyback pulse during said horizontal retrace period a pulse, whose amplitude is responsive to said beam current, in order to maintain substantially constant the amplitude of said flyback pulse.

2. A horizontal output circuit according to claim 1, wherein said voltage generating means comprises a third capacitor connected between said second end of said series circuit and one end of said DC voltage source, and said superimposing means being connected in parallel to said third capacitor and comprising a second coil, the resonating frequency of the parallel circuit formed by said third capacitor and said second coil being substantially equal to the horizontal scanning frequency.

3. A horizontal output circuit according to claim 2, wherein said superimposing means further comprises a fourth capacitor connected in series to said second coil, the series circuit formed by said fourth capacitor and said second coil being connected in parallel to said third capacitor.

4. A horizontal output circuit according to claim 3, wherein said superimposing means further comprises an impedance connected in parallel to said fourth capacitor.

5. A horizontal output circuit according to claim 1, wherein said switching means further comprises control means for alternately turning said horizontal output transistor on and off at the horizontal scan frequency, and wherein said voltage generating means comprises a third capacitor connected between one end of said series circuit and one end of said DC voltage source.

6. A horizontal output circuit according to claim 5, wherein said superimposing means being connected in parallel to said third capacitor and comprising a second coil, the resonating frequency of the parallel circuit formed by said third capacitor and said second coil being substantially equal to the horizontal scanning frequency.

7. A horizontal output circuit according to claim 6, wherein said superimposing means further comprises a fourth capacitor connected in series to said second coil, the series circuit formed by said fourth capacitor and said second coil being connected in parallel to said third capacitor.

8. A horizontal output circuit according to claim 7, wherein said superimposing means further comprises an impedance connected in parallel to said fourth capacitor.

9. A horizontal output circuit for a cathode ray tube comprising:
(a) a horizontal deflection circuit including
a horizontal deflection coil;
a first capacitor connected with said horizontal deflection coil to form a series circuit;
switching means including a horizontal output transistor and a switching element connected in series, wherein said horizontal output transistor is connected in parallel with the series circuit of said horizontal deflection coil and said first capacitor for conducting a horizontal deflection current therethrough in response to a control means during a horizontal scan period; and
a resonating capacitor connected in parallel with said series circuit for resonating with said series circuit to generate a flyback pulse during a horizontal retrace period;
(b) a DC voltage source;
(c) a flyback transformer including a primary winding, connected between said horizontal deflection coil and one end of said DC voltage source, for supplying to said horizontal deflection coil a DC component from said DC voltage source and a secondary winding for supplying to said cathode ray tube a high voltage stepped up from said flyback pulse applied to said primary winding;
(d) correction means, inserted into the path through which said DC component from said DC voltage source flows to said horizontal deflection circuit, for producing a pulse, having a compensating effect, to be superimposed on said flyback pulse during said horizontal retrace period, the amplitude of said pulse to be superimposed on said flyback pulse being responsive to said DC component flowing therethrough in such a manner that the sum of the amplitudes of said pulse to be superimposed and that of said flyback pulse remain substantially constant; and
said switching element being operatively connected in parallel with said correction means and alternately switched on and off at the horizontal scan frequency and having a fixed switching phase relationship with said horizontal output transistor and also the time at which said switching element is turned off from its conductive state by said control means precedes the turn-off time of said horizontal output transistor effected by said control means.

10. A horizontal output circuit for a cathode ray tube comprising:
a horizontal deflection coil;
a first capacitor connected in series with said horizontal deflection coil;
switching means connected in parallel with the series circuit of said horizontal deflection coil and said first capacitor for conducting a horizontal deflection current therethrough during a horizontal scan period;
a resonating capacitor connected in parallel with said series circuit for resonating with said series circuit to generate a flyback pulse during a horizontal retrace period;
a DC voltage source;
a flyback transformer means including a primary winding connected between said horizontal deflection coil and said DC voltage source for supplying to said horizontal deflection coil a DC component which is dependent upon the beam current of the cathode ray tube;
voltage generating means connected to said series circuit and responsive to said DC component for generating a voltage in accordance with said beam current to reduce the voltage across said first capacitor in response to an increase in said beam current;
superimposing means comprising a second coil, a third capacitor and a resistance means, said second coil being series-connected to the parallel combination of said third capacitor and said resistance means and this series connection being connected in parallel with the voltage generating means; and
said superimposing means being further connected to said series circuit for superimposing on said flyback pulse during said horizontal retrace period a pulse, whose amplitude is responsive to said beam current, in order to maintain substantially constant the amplitude of said flyback pulse whereby a compensating effect on any adverse change of the flyback pulse results.

11. A horizontal output circuit according to claim 10, wherein said voltage generating means comprises a fourth capacitor, said fourth capacitor being parallel-connected with the combination including the series connection of said second coil and the parallel combination of said third capacitor with said resistance means, and wherein the resonating frequency formed by said fourth capacitor and said second coil being substantially equal to the horizontal scanning frequency.

12. A horizontal output circuit according to claim 11, wherein said resistance means controls the charging capability of said third capacitor.

13. A horizontal output circuit according to claim 4, wherein said impedance controls the charging capability of said fourth capacitor.

14. A horizontal output circuit according to claim 8, wherein said impedance controls the charging capability of said fourth capacitor.

* * * * *